US006496490B1

(12) United States Patent
Andrews et al.

(10) Patent No.: US 6,496,490 B1
(45) Date of Patent: Dec. 17, 2002

(54) METHOD FOR DYNAMICALLY ALLOCATING CARRIERS IN A WIRELESS PACKET NETWORK, WITH REUSE OF CARRIERS

(75) Inventors: Daniel Matthew Andrews, New Providence, NJ (US); Simon C. Borst, North Plainfield, NJ (US); Francis Dominique, Elmwood Park, NJ (US); Predrag Jelenkovic, New York, NY (US); Krishnan Kumaran, Scotch Plains, NJ (US); Philip Alfred Whiting, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/112,547

(22) Filed: Jul. 9, 1998

(51) Int. Cl.⁷ ................................................ H04Q 7/00
(52) U.S. Cl. ...................... 370/329; 455/447; 455/450
(58) Field of Search .............................. 370/227, 228, 370/302, 329, 341, 431, 437, 450, 464; 455/450, 455, 464, 509, 516, 447

(56) References Cited

U.S. PATENT DOCUMENTS

| 5,513,379 | A | | 4/1996 | Benveniste et al. ......... 455/33.1 |
| 5,600,672 | A | * | 2/1997 | Oshima et al. .............. 375/219 |
| 6,108,321 | A | | 8/2000 | Anderson et al. ............ 370/329 |
| 6,119,011 | A | | 9/2000 | Borst et al. .................. 455/452 |
| 6,134,442 | A | | 10/2000 | Borst et al. .................. 455/445 |
| 6,154,655 | A | | 11/2000 | Borst et al. .................. 455/451 |
| 6,178,329 | B1 | * | 1/2001 | Chao et al. .................. 455/452 |

OTHER PUBLICATIONS

P. Whiting, et al. "Performance Bounds For Dynamic Channel Assignment Schemes Operating Under Varying Reuse Constraints", IEEE INFOCOM 1998, vol. 1, pp 51–58.
L.J. Cimini, Jr. et al. "Advanced Cellular Internet Service". "Wireless Simulation and Self–Organizing Spectrum Management" Simon C. Borst et al, Bell Labs Technical Journal, Summer 1997, pp. 81–98.
L. J. Cimini, Jr. et al. "Advanced Cellular Internet Service", AT&T Labs preprint, 1997, 40 pages.
U.S. patent application Ser. No. 09/900,374, Kumaran et al., filed Jul. 6, 2001.

* cited by examiner

Primary Examiner—Wellington Chin
Assistant Examiner—Brenda Pham
(74) Attorney, Agent, or Firm—Martin I. Finston

(57) ABSTRACT

We disclose a method of dynamic channel assignment for wireless transmission systems that employ time or frequency multiplexing, or both time and frequency multiplexing. The invention is specifically addressed to the problem of avoiding interference in the channels of such systems. In a broad aspect, the invention involves partitioning base stations of a network into non-interfering sets. Channels are allocated to the non-interfering sets according to need. Stages of channel reallocation take place periodically. The reallocation takes place through coordinated activity by the base stations. That is, the channel reallocation is carried out in response to information that is exchanged between base stations, or it is centrally directed by the network in response to information passed to the network by the base stations.

22 Claims, 8 Drawing Sheets

FIG. 2

REUSE GROUP

| BASE STATION | I | | | | II | | | | III | | | | IV | | | |
|---|---|---|---|---|---|---|---|---|---|---|---|---|---|---|---|---|
| CHANNEL | 1 | 2 | 3 | 4 | 5 | 6 | 7 | 8 | 9 | 10 | 11 | 12 | 13 | 14 | 15 | 16 |
| 1 | 1 | 1 | 1 | 1 | | | | | | | | | | | | |
| 2 | 1 | 1 | 1 | 1 | | | | | | | | | | | | |
| 3 | 1 | 1 | 1 | 1 | 50 | | | | | | | | | | | |
| 4 | 1 | 1 | 1 | 1 | | | | | | | | | | | | |
| 5 | 1 | 1 | 1 | 1 | | | | | | | | | | | | |
| 6 | 1 | 1 | 1 | 1 | | | | | | | | | | | | |
| 7 | 1 | 1 | 1 | 1 | | | | | | | | | | | | |
| 8 | 1 | 1 | 1 | 1 | | | | | | | | | | | | |
| 9 | | | | | 1 | 1 | 1 | 1 | | | | | | | | |
| 10 | | | | | 1 | 1 | 1 | 1 | | | | | | | | |
| 11 | | | | | 1 | 1 | 1 | 1 | 55 | | | | | | | |
| 12 | | | | | 1 | 1 | 1 | 1 | | | | | | | | |
| 13 | | | | | 1 | 1 | 1 | 1 | | | | | | | | |
| 14 | | | | | 1 | 1 | 1 | 1 | | | | | | | | |
| 15 | | | | | 1 | 1 | 1 | 1 | | | | | | | | |
| 16 | | | | | 1 | 1 | 1 | 1 | | | | | | | | |
| 17 | | | | | | | | | 1 | 1 | 1 | 1 | | | | |
| 18 | | | | | | | | | 1 | 1 | 1 | 1 | | | | |
| 19 | | | | | | | | | 1 | 1 | 1 | 1 | 60 | | | |
| 20 | | | | | | | | | 1 | 1 | 1 | 1 | | | | |
| 21 | | | | | | | | | 1 | 1 | 1 | 1 | | | | |
| 22 | | | | | | | | | 1 | 1 | 1 | 1 | | | | |
| 23 | | | | | | | | | 1 | 1 | 1 | 1 | | | | |
| 24 | | | | | | | | | 1 | 1 | 1 | 1 | | | | |
| 25 | | | | | | | | | | | | | 1 | 1 | 1 | 1 |
| 26 | | | | | | | | | | | | | 1 | 1 | 1 | 1 |
| 27 | | | | | | | | | | | | | 1 | 1 | 1 | 1 |
| 28 | | | | | | | | | | | | | 1 | 1 | 1 | 1 | 65 |
| 29 | | | | | | | | | | | | | 1 | 1 | 1 | 1 |
| 30 | | | | | | | | | | | | | 1 | 1 | 1 | 1 |
| 31 | | | | | | | | | | | | | 1 | 1 | 1 | 1 |
| 32 | | | | | | | | | | | | | 1 | 1 | 1 | 1 |

FIG. 5

| | REUSE GROUP | | | | | | | | | | | | | | | |
|---|---|---|---|---|---|---|---|---|---|---|---|---|---|---|---|---|
| | I | | | | II | | | | III | | | | IV | | | |
| BASE STATION | 1 | 2 | 3 | 4 | 5 | 6 | 7 | 8 | 9 | 10 | 11 | 12 | 13 | 14 | 15 | 16 |
| CHANNEL 1 | | | | 1 | | | | | | | | | | | | |
| 2 | | | | 1 | | | | | | | | | | | | |
| 3 | | | | 1 | | | | | | | | | | | | |
| 4 | | | | 1 | | | | | | | | | | | | |
| 5 | | | | 1 | | | | | | | | | | | | |
| 6 | | | | 1 | | | | | | | | | | | | |
| 7 | | | | 1 | | | | | | | | | | | | |
| 8 | | | | 1 | | | | | | | | | | | | |
| 9 | | | | | | | 1 | 1 | | | | | | | | |
| 10 | | | | | | | 1 | 1 | | | | | | | | |
| 11 | | | | | | | 1 | 1 | | | | | | | | |
| 12 | | | | | | | 1 | 1 | | | | | | | | |
| 13 | | | | | | | 1 | 1 | | | | | | | | |
| 14 | | | | | | | 1 | 1 | | | | | | | | |
| 15 | | | | | | | I | 1 | | | | | | | | |
| 16 | | | | B | | | I | I | | | | | | | | |
| 17 | | | | | | | | | | 1 | | 1 | | | | |
| 18 | | | | | | | | | | 1 | | 1 | | | | |
| 19 | | | | | | | | | | 1 | | 1 | | | | |
| 20 | | | | | | | | | | 1 | | I | | | | |
| 21 | | | | | | | | | | 1 | | I | | | | |
| 22 | | | | | | | | | | 1 | | I | | | | |
| 23 | | | | | | | | | | 1 | | I | | | | |
| 24 | | | | | | | | | | 1 | | I | | | | |
| 25 | | | | | | | | | | | | | 1 | 1 | 1 | 1 |
| 26 | | | | | | | | | | | | | 1 | 1 | 1 | 1 |
| 27 | | | | | | | | | | | | | 1 | 1 | I | 1 |
| 28 | | | | | | | | | | | | | I | 1 | I | 1 |
| 29 | | | | | | | | | | | | | I | I | I | 1 |
| 30 | | | | B | | | | | | | | | I | I | I | I |
| 31 | | | | B | | | | | | | | | I | I | I | I |
| 32 | | | | | | | | | | | | | I | I | I | I |

FIG. 9

| BASE STATION | REUSE GROUP | | | | | | | | | | | | | | | |
|---|---|---|---|---|---|---|---|---|---|---|---|---|---|---|---|---|
| | I ⌐120 | | | | II ⌐120 | | | | III ⌐120 | | | | IV ⌐120 | | | |
| | 1 | 2 | 3 | 4 | 5 | 6 | 7 | 8 | 9 | 10 | 11 | 12 | 13 | 14 | 15 | 16 |
| CHANNEL 1 | | | | | | 1 | | 1 | | | 1 | | 1 | | | |
| CHANNEL 2 | | | | | | | | | | | | | | | | |
| CHANNEL 3 | | | | | | | | | | | | | | | | |

FIG. 11

REUSE GROUP

| BASE STATION | I | | | | II | | | | III | | | | IV | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |

CHANNEL

| Channel | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 1 | 1 | 1 | 1 | | | | | | | | | | | | |
| 2 | 1 | 1 | 1 | 1 | | | | | | | | | | | | |
| 3 | 1 | 1 | 1 | 1 | | | | | | | | | | | | |
| 4 | 1 | 1 | 1 | 1 | | | | | | | | | | | | |
| 5 | 1 | 1 | 1 | 1 | | | | | | | | | | | | |
| 6 | 1 | 1 | 1 | 1 | | | | | | | | | | | | |
| 7 | 1 | 1 | 1 | 1 | | | | | | | | | | | | |
| 8 | 1 | 1 | 1 | 1 | | | | | | | | | | | | |
| 9 | | | | | C | C | A | C | | | | | | | | |
| 10 | | | | | A | C | A | C | | | | | | | | |
| 11 | | | | | C | A | C | A | | | | | | | | |
| 12 | | | | | C | C | C | A | | | | | | | | |
| 13 | | | | | C | C | A | A | | | | | | | | |
| 14 | | | | | A | C | C | A | | | | | | | | |
| 15 | | | | | A | C | A | A | | | | | | | | |
| 16 | | | | | C | A | C | C | | | | | | | | |
| 17 | | | | | | | | | C | C | A | C | | | | |
| 18 | | | | | | | | | C | C | A | A | | | | |
| 19 | | | | | | | | | C | C | C | A | | | | |
| 20 | | | | | | | | | A | C | A | C | | | | |
| 21 | | | | | | | | | C | A | A | A | | | | |
| 22 | | | | | | | | | C | C | A | C | | | | |
| 23 | | | | | | | | | C | C | A | C | | | | |
| 24 | | | | | | | | | C | A | C | C | | | | |
| 25 | | | | | | | | | | | | | A | C | C | C |
| 26 | | | | | | | | | | | | | A | C | C | C |
| 27 | | | | | | | | | | | | | A | A | C | A |
| 28 | | | | | | | | | | | | | A | A | C | C |
| 29 | | | | | | | | | | | | | C | A | A | C |
| 30 | | | | | | | | | | | | | A | A | A | C |
| 31 | | | | | | | | | | | | | C | A | C | C |
| 32 | | | | | | | | | | | | | C | C | A | A |

METHOD FOR DYNAMICALLY ALLOCATING CARRIERS IN A WIRELESS PACKET NETWORK, WITH REUSE OF CARRIERS

FIELD OF THE INVENTION

This invention relates to methods for operating a packetized wireless communication network in which multiple radio-frequency channels are available for transmitting signals between user terminals such as mobile stations and the base stations that serve them. More specifically, the invention relates to methods for allocating the available channels among a group of base stations according to time-varying and spatially inhomogeneous demands for transmission capacity.

ART BACKGROUND

Packetized wireless communication networks, such as cellular telephone networks, are already in wide use for carrying voice traffic. The use of portable personal computers is also widespread. There is now a growing demand for wireless networks to carry high-speed data traffic in addition to voice traffic, so that data can be exchanged, without wired connections, among portable or mobile computers.

However, computer-data traffic differs significantly from voice traffic in several respects. Because of these differences, schemes for the use of network resources that afford both high quality and high efficiency of voice traffic do not, typically, offer the same for data traffic.

That is, whenever a constant level of channel capacity is allocated to a signal source, there will be a trade-off between delay and efficiency of channel usage. The more bursty the signal source, the more severe is this trade-off. For example, if the allocated capacity is set at the peak data rate, there will be nothing transmitted during the relatively long periods of silence between bursts. On the other hand, if the allocated capacity is set at the mean data rate, there will be relatively long delays while the buffers in the transmission path are emptying. Moreover, if the allocated channel capacity is set too low relative to the buffer capacity, there will be a danger of overflowing the buffers and thereby losing data.

Because speech is only moderately bursty, this trade-off is relatively mild. For that reason, the allocated channel capacity for typical speech signals can be set relatively high, e.g. at or near the peak data rate, without risking any drastic inefficiency in channel usage. As a consequence, transmission delays long enough to be annoying to the user engaging in a spoken conversation can generally be avoided.

By contrast, computer data representing, for example, a Web page will typically be delivered as a succession of bursts, each containing 100 kbits or more of data. Periods of transmissive activity may be separated by relatively long periods of inactivity lasting tens or even hundreds of seconds, during which a user at the receiving end is reading the transmitted information. A computer user will generally tolerate much more delay than will a user of a voice telephone. For example, a typical user at the present time would find it quite acceptable to wait several seconds between demanding a Web page (by clicking a mouse with the cursor situated at an appropriate portion of the computer screen) and receiving the Web page. However, the satisfactory delivery of Web-page data calls for bit-error rates that are significantly lower than those required for voice transmission.

Typical wireless links that are available at the present time are limited to bit rates of about 10 kbits per second or less. Bit rates of about 10 kbits per second are adequate for carrying at least some kinds of data traffic, but only with the relatively long delays described above. At the present time, however, such transmission is inefficient because the calls are charged as voice calls, even though they use only a limited portion of the relevant channel capacity at any given point in time.

Improvement is expected in the near future, when some wireless spectrum will be allocated for use by high-speed data networks. In fact, it may become possible to provide wireless links transmitting at a gross user bit rate of 1000 kbits per second in both the uplink and downlink directions.

Each individual user will need only a fraction of this gross rate, and his use of it will be intermittent. Therefore, even at a gross user bit rate smaller than 1000 kbits per second, it will be feasible for multiple users in each cell, such as ten or twenty users per cell, to simultaneously share the data-carrying wireless link.

Practitioners in the field of wireless data communication have recognized that there is a need for schemes for efficient sharing of this wireless resource, both as it exists at the present time, and as it will exist in the future.

In at least some wireless data networks, data will be transmitted on the down link using a set of some finite number of carriers (i.e., frequency channels), such as a set of 32 carriers. Each individual base station may be allocated some subset of these carriers, such as eight carriers per base station. This allocation is designed in such a way that neighboring base stations (more specifically, base stations having overlapping reception zones) do not share the same carriers.

If the demands on the network were uniform and predictable, a fixed allocation could be made that would use the available resources with high efficiency. However, the number of mobile stations within a given cell that may demand data services is highly variable. Within a given population of such mobile stations, the rate at which, e.g., requests for Web pages are being made is also highly variable. Neither the distribution of mobile stations nor the rate of data requests can be predicted with accuracy. Therefore, it will be typical for queues of packets to vary considerably in length from base station to base station (at any given time), and to vary considerably in length from one time to another at each individual base station.

Under these conditions, a fixed allocation of carriers to each base station may fail to provide optimum efficiency, or even a commercially viable level of efficiency, in the use of the data-carrying resources. That is because a fixed allocation lacks the flexibility to deal efficiently with a variable load.

For example, when the number of mobile stations served by a base station has reached the maximum that can be supported by the allocated carriers, the base station must reject further requests for service, even though other, unused carriers may be available at other points in the network.

Similarly, heavy demand in a particular cell may cause a long queue of packets to build up in the buffers of the corresponding base station. Although there may be unused carriers available at other points in the network, no additional carriers are available to relieve the queue at the particular base station. One consequence is that spectrum is used inefficiently because carriers go unused in some parts of the network while service requests are denied for lack of capacity in other parts of the network. A further consequence is that buffer capacity is used inefficiently. That is, packets are lost due to overflow of buffers in some parts of the network, while buffers are underfilled in other parts of the network.

In order to solve these problems of efficiency, among others, there is a need for methods of channel allocation in which available carriers are allocated among base stations, at least in part, according to time-varying and spatially inhomogeneous demand for transmission capacity. Such methods are said to carry out "Dynamic Channel Assignment (DCA)."

SUMMARY OF THE INVENTION

We have invented a method of DCA. Our invention pertains to wireless transmission systems that employ time or frequency multiplexing, or both time and frequency multiplexing. The invention is specifically addressed to the problem of avoiding interference in the channels of such systems. By way of example, one specific field of application for the invention is Time-Division Multiple Access (TDMA), including Orthogonal Frequency-Division Multiplexing (OFDM) (which is a variation of TDMA).

In a broad aspect, the invention involves partitioning base stations of a network into non-interfering sets. One example of such sets are reuse groups, as defined below. Channels are allocated to the non-interfering sets according to need. Some measures of need, useful in this regard, relate to the queue lengths of the mobile stations served by the base stations of the non-interfering set. (The term queue length is defined below.) Stages of channel reallocation take place during time intervals referred to as superframes, which are defined below. The reallocation takes place through coordinated activity by the base stations.

By "coordinated activity" is meant that channel reallocation is carried out in response to information that is exchanged between base stations, or that it is centrally directed by the network in response to information passed to the network by the base stations. A typical central location in the network for the relevant calculations to be carried out is the Mobile Switching Center (MSC). In certain specific embodiments of the invention, for example, the reallocation takes place in response to transactions between neighboring base stations.

Our method of DCA provides a much faster response time than conventional call-level DCA schemes, which are intended primarily for voice traffic in circuit-switched networks. We believe that because of its fast response, our method makes it possible to dynamically allocate channels for packetized data transmission within practical limits on both latency and delay.

By "latency" is meant the length of a superframe, as determined by the complexity of our DCA procedures. More specifically, the length of a superframe is dictated by the time required by the exchange of information between network elements and the performance of computations using the exchanged information in support of the relevant DCA procedure.

By "delay" (in the context of packetized data transmission) is meant the time between arrival and transmission of a packet. The mean delay, simply stated, is the average waiting period of queued packets. More precisely, it is the total delay of all packets, divided by the total number of packets, taken in the long run and for many packets.

GLOSSARY OF TERMS

A network is said to employ reuse if it avoids interference by permitting or denying each base station the use of specific channels in accordance with a prearranged plan. In such a network, a given channel can be reused in geographically separated domains in accordance with the prearranged plan.

The term channel as it is used herein pertains to methods of time or frequency multiplexing. In a time-multiplexed network, a channel is a given time slot. In a frequency multiplexed network, a channel corresponds to a given carrier frequency or frequency band. In networks that are both time and frequency multiplexed, a channel is a given time slot at a given carrier frequency.

The term reuse group denotes a group of base stations, each chosen such that its zone of reception overlaps the reception zones only of base stations in other reuse groups. Stated simply, the base stations are partitioned into reuse groups such that neighboring base stations must belong to distinct reuse groups.

The term queue length denotes the number of packets, or other units of buffer content such as (in certain cases) bytes or cells, associated with a given mobile station.

The term superframe denotes a division of time comprising a group of one or more contiguous frames of fixed length. The term "frame" here has its usual meaning in the context of packetized communications, and thus it denotes a basic unit for data transmission, typically including a header that contains, inter alia, synchronizing information.

A superframe is the time period during which the present channel allocation is held constant and the next channel allocation is computed.

The duration of a superframe is determined by the time required for base stations to exchange such information, and to perform such computations, as are needed to carry out a round of channel reallocation as discussed below. However, this duration is also preferably made short enough that the resulting latency in transmission of packets falls within acceptable limits. (It should be noted in this regard that signalling within the network that is required to carry out the channel reallocations may take place in a dedicated channel, or it may share the same band as data traffic.)

A typical superframe comprises 10–25 frames. Thus, for example, a superframe of twenty-five 40-ms frames will endure for one second.

BRIEF DESCRIPTION OF THE DRAWINGS

FIG. 2 is an assignment matrix (A-matrix), representing an exemplary allocation of channels to the base station array of FIG. 1.

FIG. 5 is a partially filled A-matrix, intended to further illustrate the carrier requesting method when read together with FIGS. 1 and 2.

FIG. 9 is a portion of an A-matrix, illustrating the allocation of one channel to an MIS in accordance with the LP-based method.

FIG. 10A applies to base stations in passive reuse groups. FIG. 10B applies to base stations in the active reuse group.

FIG. 11 is an A-matrix, modified to show the possible results of one round of borrowing by a single base station in accordance with the carrier raking method of FIG. 10.

DETAILED DESCRIPTION

The following discussion, for illustrative purposes, will be addressed primarily to channel assignment in the downlink direction of wireless communication networks such as cellular telephone systems. However, it is not intended that the invention should be limited to the downlink direction only. The principles of the invention will apply equally well to uplink transmission by individual transmitters over multiple allocable channels. Thus, both downlink and uplink transmission lie within the scope of the invention.

Figure 1:
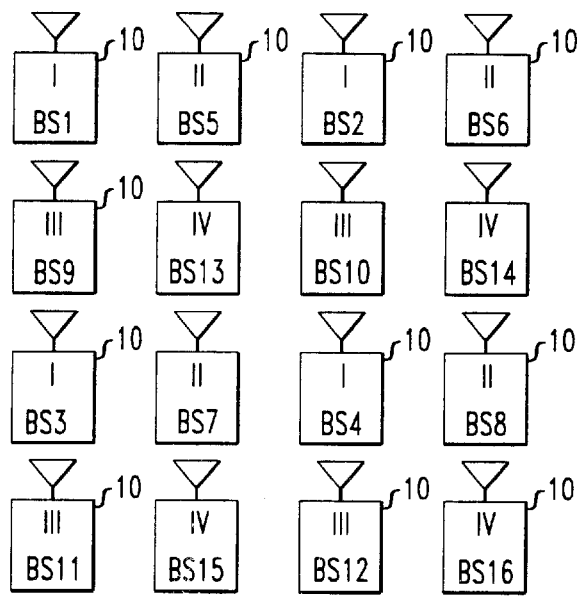
FIG. 1 is a schematic representation of an exemplary array of base stations. The base stations are numbered sequentially from BS 1 to BS 16. The base stations are grouped into reuse groups I–IV, in accordance with the invention in certain embodiments. In reading this figure, it should be understood that interference is between neighboring base stations only, including diagonal neighbors, and that connectivity does not exhibit wraparound between opposite edges of the network as shown.

An illustrative wireless network comprises a geographically distributed array of base stations 10, as shown in FIG. 1. It is assumed, for purposes of illustration, that two base stations of this array mutually interfere if they are horizontally, vertically, or diagonally adjacent to each other (as represented in the figure), but otherwise, they do not mutually interfere. The respective base stations are numbered BS1–BS16 for reference in the following discussion.

It will be helpful, as an aide to understanding the invention, for us to refer to an assignment matrix (for brevity referred to below as an A-matrix) whose entries represent assignments of channels to base stations. Referring, for example, to the A-matrix of FIG. 2, it will be evident that each row of the A-matrix represents a distinct channel and each column represents a distinct base station in accordance with the base-station numbering system of FIG. 1. The entry of the binary digit 1 at a given row-column position in the A-matrix indicates that the corresponding channel has been assigned to the corresponding base station. Row-column positions in which a 1 has not been entered may be regarded as empty, or as having the binary digit 0 entered therein.

In accordance with our invention, the entries in the A-matrix (or in some portion of the A-matrix) are revised once in each superframe. It is an objective of the invention to make these entries in such a way that channels are distributed effectively and fairly among the base stations, without interference between base stations.

As will be appreciated by those skilled in the art, the mathematical problem of finding the A-matrix with an optimum number (such as the maximum number) of non-zero entries, without interference, is very difficult. (In fact, it is classified as an "NP-complete problem.)

Various approaches are possible to the problem of filling the A-matrix. In respective sections that follow, we describe three particular exemplary approaches, which we refer to as: (i) the carrier requesting method; (ii) the linear programming (LP) based method; and (iii) the carrier raking method.

Once a base station has been allocated its share of channels, the next step is (for each base station) to allocate these channels among its own set of mobile stations. It is desirable for this process to take into consideration the individual queue belonging to each mobile station.

Let the total number of carriers be c. (This many have been allocated to the base station, as reflected in the A-matrix.) Let the total number of mobile stations be m. Let the queue length at the i'th mobile station be $q_i$. Then one possible approach is to assign carriers in proportion to queue length. That is, let the index j run over all of the mobile stations 1, . . . , m, and to the i'th mobile station, assign the number of carriers closest to (but not more than)

$$c \frac{q_i}{\sum_j q_j}.$$

Now a problem with this naive scheme is that by prearrangement, a given mobile station may have a maximum number $S_{max}$ of channels that it is permitted to take. Under the scheme as described so far, it is possible that more than S. channels might be assigned to a mobile station. One possible approach to this problem is to reassign the excess channels according to queue length. One first removes all mobiles which already have the maximum allocation of carriers. Then, for each remaining mobile, one computes the ratio of the queue length to the number of carriers allocated. The mobile with the largest such value is given the first excess carrier. If this mobile has then reached its maximum allocation, it is deleted. If not, then the ratio of queue length to number of carriers is recomputed for this mobile. Again, the mobile with the largest ratio is allocated the next carrier. This process is repeated until the excess carriers are exhausted or every mobile reaches the maximum.

Figure 3:
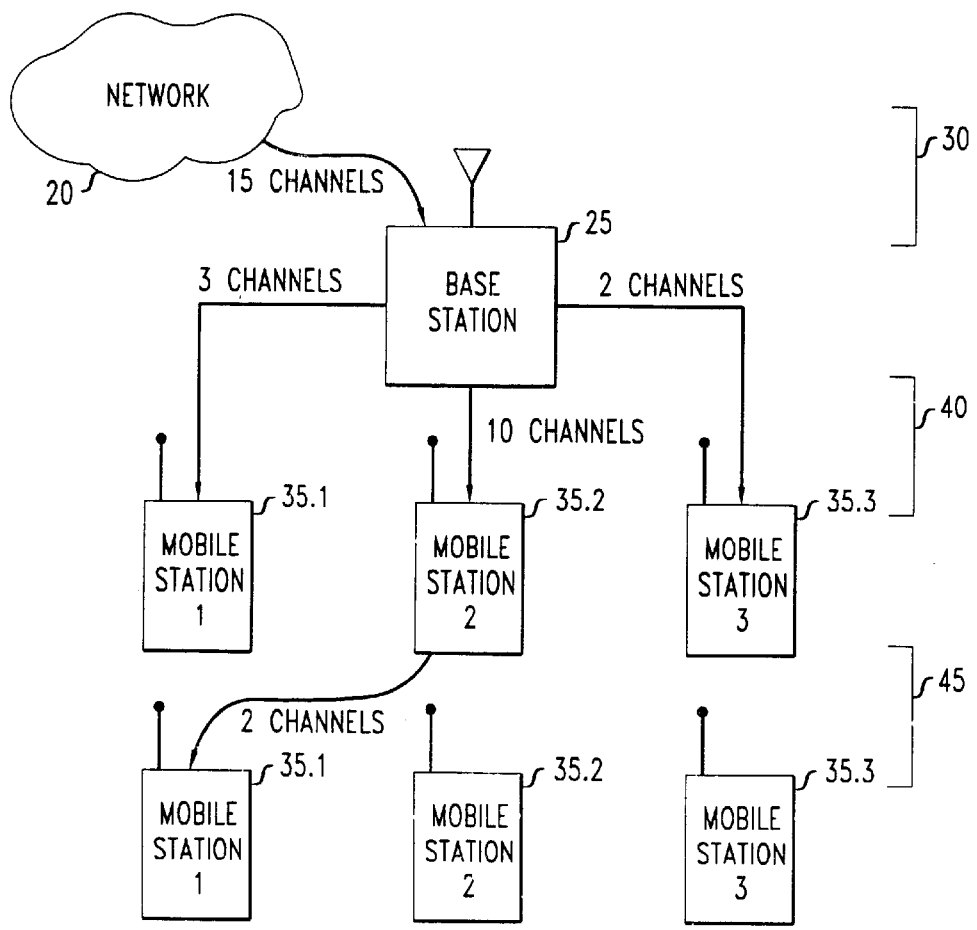
FIG. 3 is a flowchart, illustrating an exemplary scheme for allocation of channels by a base station to mobile stations, in accordance with the invention in certain embodiments.

For example, with reference to FIG. 3, let c=15. That is, 15 channels are allocated by network 20 to base station 25 in process 30 as depicted in the figure. Let mobile stations 35.1, 35.2, and 35.3 have queues of respective lengths 30, 100, and 20. Let $S_{max}$=8. Then the initial assignment, shown in the figure as the outcome of process 40, is 3 channels to mobile station 35.1, 10 channels to mobile station 35.2, and 2 channels to mobile station 35.3. Mobile 35.2 now has two more channels than it can use. This mobile station is removed from further consideration, and the two excess channels are reassigned as we now describe.

The ratio for mobile 35.1 is 30/3=10, and for mobile 35.3 it is 20/2=10. This is a tie. In the case of such a tie, we choose the first mobile (i.e., mobile station 35.1), and we allocate the first excess channel to it. Mobile 35.1 now has 4 channels, and the corresponding ratio is 30/4=7.5. Hence, the second excess channel is now allocated to mobile 35.3. The final allocation is 4 channels to mobile 35.1, 8 to mobile 35.2 and 3 channels to mobile 35.3.

Typically, the complete reallocation procedure is repeated once in each superframe. (However, in, e.g., the carrier raking method that we describe below, the reallocation procedure takes place in one round for each reuse group, and only one round takes place per superframe.)

The Carrier Requesting Method

We now describe the carrier requesting method for filling the A-matrix. The base stations of the network are divided into reuse groups. The reuse groups are chosen such that the zone of reception of each base station overlaps the reception zones only of base stations in other reuse groups. Stated simply, neighboring base stations must be in distinct reuse groups. The full set of channels is divided into equal subsets initially allocated to respective reuse groups. As explained below, this is a nominal allocation only. For illustrative purposes, it is assumed that a full set of 32 channels is allocated among four reuse groups, eight channels to each reuse group. This is an example of nominal even sharing. The number of channels in one of these subsets is denoted herein by $N_{RG}$.

An example is provided by the A-matrix of FIG. 2. As shown there (as well as in FIG. 1, which should be read together with FIG. 2), the respective reuse groups are denoted by the Roman numerals I–IV. The respective channels are numbered 1–32. To reuse group I, channels 1–8 are assigned as indicated in FIG. 2 by the cluster of non-zero entries labeled with the reference numeral 50. To reuse group II, channels 9–16 are assigned as indicated by cluster 55. To reuse group III, channels 17–24 are assigned, and to reuse group IV, channels 25–32 are assigned, as indicated by clusters 60 and 65, respectively.

Figure 4:
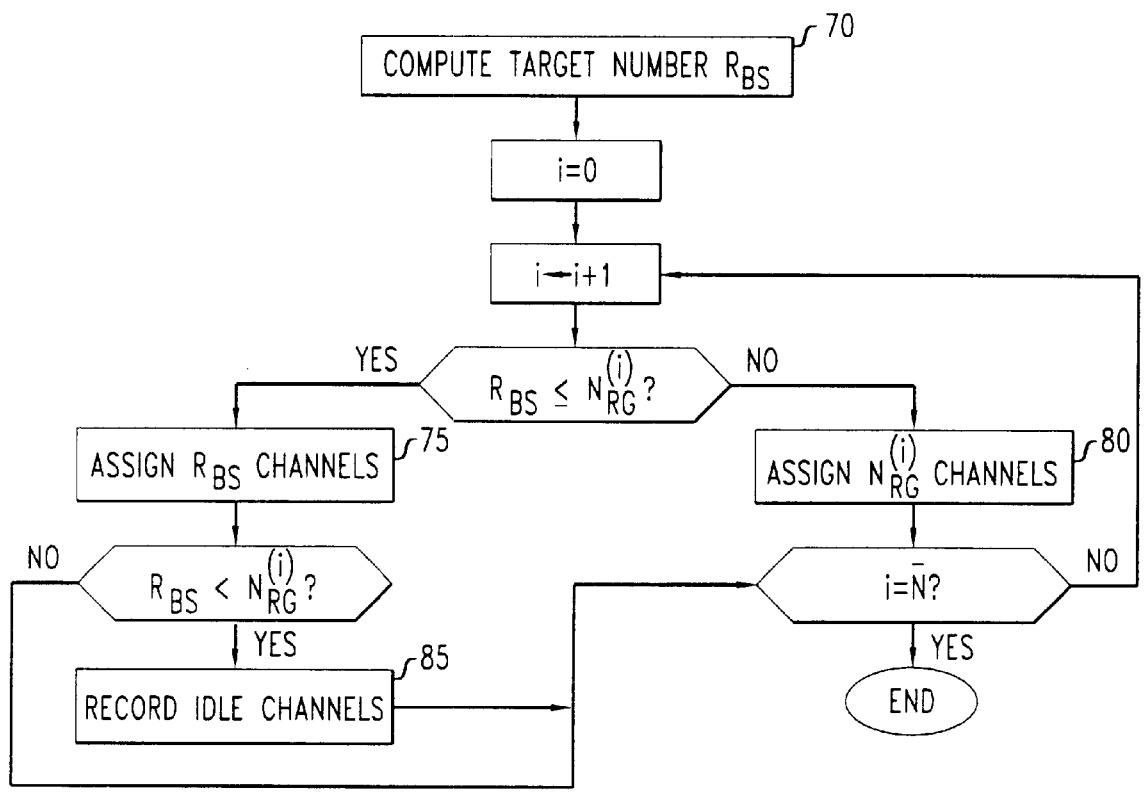
FIG. 4 is a flowchart of an illustrative procedure for initial channel assignment, in accordance with the inventive carrier requesting method of dynamic channel assignment in certain embodiments.

As shown in box 70 of FIG. 4, each base station computes a target number of channels, based on the existing queue length at that base station. The target number may not exceed the total number of channels (which in the present example is 32). The computation may also take into account relevant hardware constraints, such as any upper limit on the number of carriers that can be received by an individual mobile station. This target number is represented herein as the request function $R_{BS}$.

One formula for obtaining $R_{BS}$ invokes the queue length $Q_i$ of the i'th mobile station (i.e., the number of packets waiting in the queue of that mobile station), the number M of packets that can be transmitted on one channel within a single superframe, and the maximum number $S_{max}$ of channels that can be assigned to a single mobile station. This formula is expressed as the following summation over all of the mobile stations belonging to a given base station. The index i ranges from 1 to the total number $\overline{N}$ of mobile stations. In the summation, no term may be greater than $S_{max}$, and each ratio $Q_i : M$ is rounded up to the closest integer:

$$R_{BS} = \sum_i \min\left\{ \left\lceil \frac{Q_i}{M} \right\rceil, S_{max} \right\}.$$

As shown in box 75 of FIG. 4, the network then assigns to each base station the first $R_{BS}$ channels of that station's reuse group. However, as shown in box 80 of the figure, no more channels are assigned in this step than the number (in this example, eight) assigned to the corresponding reuse group. Advantageously, each base station that has requested fewer than this maximum number of channels records its idle channels (box 85). By idle channels is meant those of the base station's nominal allocation that are in excess of its request and therefore have not been assigned to it.

Requests for more than $N_{RG}$ channels remain, at this stage, partially unfilled. The base stations issuing such requests will be referred to herein as borrowers.

Each borrower then requests one or more channels from neighboring base stations belonging to a reuse group not its own. The selection of such a reuse group may be described by reference to a permutation of the reuse groups under which no reuse group has itself as an image. In these terms, each borrower makes this request to neighboring base stations whose reuse group is the image, under the permutation, of the borrower's own reuse group. For simplicity, it is advantageous to choose a cyclic permutation, under which each reuse group changes by one position.

Borrowing takes place in one or more rounds. The maximum number of rounds is one fewer than the total number of reuse groups. Thus in the present example, there are at most three rounds of borrowing.

In round one, each borrower directs requests to every neighboring base station that belongs to the selected reuse group. In the course of each such request, the borrower polls, in sequence, each channel allocated to the selected reuse group. Thus, in the present example, a group I borrower might ask its group II neighbors, "is channel 9 idle?" If all of the group II neighbors respond affirmatively, the borrower takes channel 9, and decrements by 1 the number of channels that it needs to borrow. If at least one of the group II neighbors responds negatively, the borrower proceeds to the next channel in sequence. This process continues until the borrower's requirement for channels is filled, or until the last of the channels assigned to the selected group has been polled.

A further example is provided by the partially filled A-matrix of FIG. 5, which should be read with reference to FIGS. 1 and 2. For simplicity, it is assumed that borrowing is being done only by base station 4. In this example, base station 4 (of reuse group I) has a target number of 11, which exceeds by 3 the number of channels initially allocated to the base station. In the first round of borrowing, base station 4 queries its group II neighbors, namely base stations 7 and 8. Base station 7 has channel 15 idle (indicated by the letter "I" in the figure), but base station 8 is using this channel. Both neighbors have channel 16 available, so this channel may be borrowed. In the next round, base station 4 queries its group II neighbors and its group III neighbors (base stations 10 and 12) as to channels 17–24, but none are available for borrowing. In the last round, base station 4 queries its group II and III neighbors, and its group IV neighbors (base stations 13–16) as to each of channels 25–32, in turn. Channels 30 and 31 are found to be available for borrowing. The procedure need not proceed to channel 32, because the borrowing base station's requirement for channels is now filled. (In the figure, the letter "B" in the column assigned to base station 4 indicates channels that are borrowed.)

For the greatest efficiency, it is desirable for base stations of all of the reuse groups to be carrying out this borrowing procedure at the same time. The rounds should be completed in strict order by each base station, to prevent the eventuality that neighboring base stations will end up using the same channel.

Subsequent rounds of borrowing take place in essentially the same way. In the present example, the cyclic permutation is again applied, such that the base stations of each reuse group are now borrowing from the reuse group that lies two positions away. It should be noted that in the first round, group II base stations borrowed group III channels. In the second round, group I base stations (which are now seeking to borrow group III channels) must query their neighboring base stations of both group II and group III. Otherwise, a group I station could borrow a channel that one of its group II neighbors previously borrowed from a group III base station. This would of course lead to interference between these particular group I and group II stations.

Figure 6:
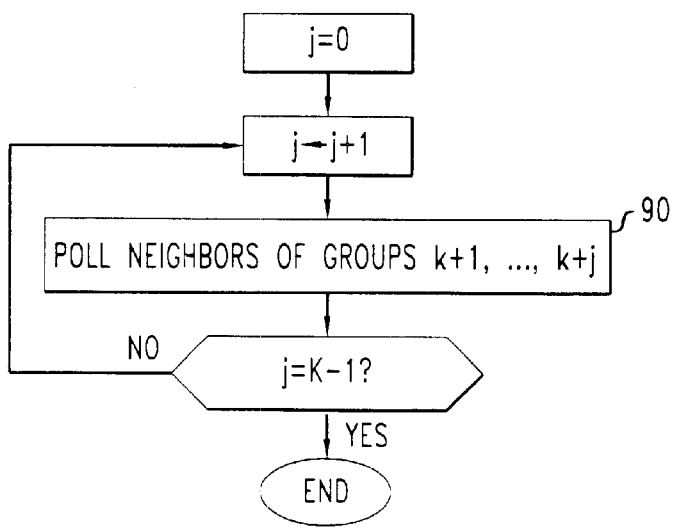
FIG. 6 is a flowchart of an illustrative channel-borrowing procedure, in accordance with the carrier requesting method in certain embodiments.

More generally (assuming cyclic permutations are used as described above), in the jth round of borrowing, base stations of reuse group k should query their neighboring base stations of reuse groups k+1, k+2 . . . , k+j. (These indices are to be taken modulo K, where K is the total number of reuse groups.) This is summarized in FIG. 6, in which each round of polling is represented by an iteration of box 90.

All of the rounds of borrowing take place within one superframe, and are effective in the next superframe. It is advantageous to carry out the relevant computations as late as possible within the first of these two superframes, in order to assure that the information used is as timely as possible. Optionally, the order in which application is made to successive reuse groups for borrowed channels may be changed between superframes. This is advantageous, for example, when there is inhomogeneity in the numbers of mobile stations served by the respective base stations, or other differences in the respective levels of demand. In such cases, fairness tends to be increased by permuting the borrowing order.

It could happen that after all rounds of borrowing are completed, a base station is left with idle channels that have not been borrowed. It at least some cases, it will be advantageous to permit such a base station to use its own idle channels in reducing its queue of waiting packets.

In alternate embodiments, the evaluation of $R_{BS}$ (for the next superframe) may be based, not simply on present requirements (e.g. within a narrow time window at the end of a superframe), but on a calculated projection of the current superframe's requirements into the near future.

The carrier requesting technique for filling the A-matrix is advantageous because it is relatively fast. In fact, we believe that in at least some practical applications, the latency of this approach will be as small as 0.1–0.2 seconds.

Furthermore, the information processing that is required is highly distributed, in that it depends on exchange of data only between neighboring base stations. As a consequence, it imposes a relatively light communication burden on the network. This technique achieves at least some level of efficiency by reallocating channels according to need. While doing so, it preserves at least some degree of fairness by assuring that each base station can use at least the nominally allocated number of channels. Thus, it is unlikely for base stations of any one reuse group to take a grossly disproportionate share of the channels.

In its broad aspect, the carrier requesting technique encompasses numerous variations of the illustrative scheme described above. We refer to one such variation as global carrier requesting. In global carrier requesting, the base stations of only a single reuse group carry out the borrowing operation in any given superframe. A borrowing base station is permitted to borrow channels from neighboring base stations belonging to any reuse group not its own. In each superframe, the borrowing reuse group is that group having the greatest aggregate queue length. The aggregate queue length of a given reuse group is computed, for example, by summing $q_i$ over all of the base stations of that reuse group. One alternative is to sum an indirect measure, such as the request function, over all base stations of the reuse group.

(More generally, base stations from distinct reuse groups may be given priority, provided there is no possibility of the same channel being allocated to mutually interfering base stations.)

Global carrier requesting is advantageous because computationally, it is relatively simple. As a consequence, the necessary computations can be performed relatively quickly.

The LP-Based Approach

We now turn to the second method for filling the A-matrix. This method is referred to as the Linear Programming (LP) Based approach. In order to explain this method, it is helpful to introduce the concept of a Maximum Weight Independent Set (MIS) of base stations. The MIS is a subset of the set of all base stations in the network. More specifically, it is a non-interfering set; i.e., all of the base stations in the MIS can transmit simultaneously without excessive interference. Still more specifically, the MIS comprises those base stations whose aggregate queue length exceeds that of any other non-interfering set.

Figure 7:
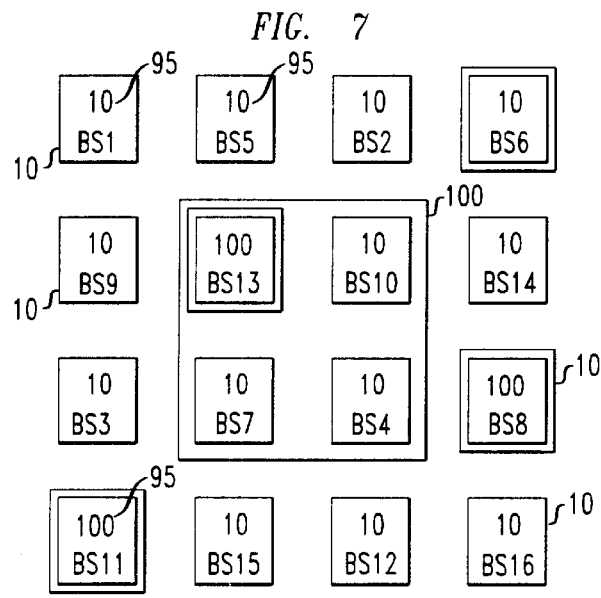
FIG. 7 is a further schematic representation of the base station array of FIG. 1. Indicated by double outlines in FIG. 7 are the base stations of a Maximum Independent Set (MIS). Also indicated in the figure is an illustrative maximal clique 100. The MIS and the maximal clique are shown in this figure as an aide to a fuller appreciation of the inventive LP-based method of dynamic channel assignment. (As noted in connection with FIG. 1, interference is between neighbors, with no wraparound between opposite edges.)

An exemplary MIS is depicted in FIG. 7. Shown in FIG. 7 is the same array of base stations 10, numbered sequentially from BS1–BS16, that were shown previously in FIG. 1. In the figure, each of the numbers indicated by the reference numeral 95 represents the queue length of a respective base station. For simplicity, each of these queue lengths is assumed to be either 10 or 100. The base stations numbered BS6, BS8, BS11, and BS13 together constitute an MIS. No additional base station can be added to this set of base stations without interference. The aggregate queue length of these base stations is 310. No other non-interfering set has as high an aggregate queue length.

Figure 8:
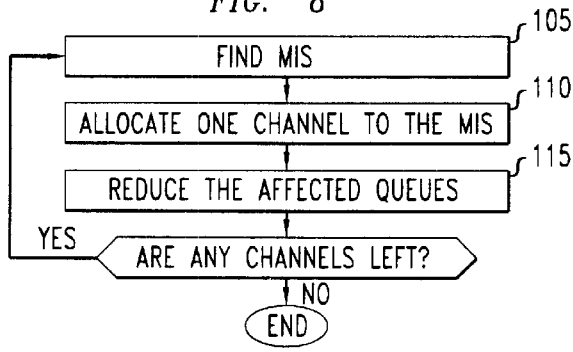
FIG. 8 is a flowchart of the LP-based method in certain embodiments.

This method is carried out by using well-known techniques of linear programming to find the MIS (box 105 of FIG. 8). One channel is allocated to the MIS (box 110 of the figure). The affected queues are reduced in length by the capacity of the allocated channel (box 115 of the figure). This procedure is then repeated, once per remaining channel, until all available channels have been allocated. In each iteration, a new MIS is found, and a further channel is allocated accordingly.

FIG. 9 shows one filled-in row of the A-matrix, corresponding to the assignment of channel 1 to the MIS shown in FIG. 7. The reuse-group headings 120, although not directly relevant in this context, have been left on the A-matrix in order to show the distinction between channel assignment by MIS, as in the present technique, and channel assignment by reuse group, as in the hole-filling method described earlier.

The problem of finding the MIS may be expressed in mathematical notation by:

$$\operatorname*{Max}_{x}\left\{\sum_{i} x_i q_i\right\}; \quad x_i = \begin{cases} 0 \\ 1; \end{cases} \quad \forall C, \sum_{i \in C} x_i \leq 1.$$

Here, x is a vector consisting of 0s and 1s (as defined in the second expression), and it has as many components as there are base stations in the network. There is a distinct vector x for each subset of base stations in the network. In each such vector, $x_i$ is set to 1 if base station i is in the corresponding subset, and otherwise set to 0. Thus, the index i over which the first summation is carried out runs over all base stations in the network. The queue length at base station i is $q_i$. Thus, the sum is taken over all queues in the subset denoted by x.

The third expression above expresses the non-interference condition subject to which the maximization is carried out. The condition must be satisfied for each set C belonging to a collection of sets of base stations referred to as "maximal cliques." A maximal clique is a largest possible set of mutually interfering base stations (in which every base station interferes with every other base station). The pertinent summation is carried out over all base stations belonging to the given maximal clique. This summation is here required to be 0 or 1 for every maximal clique in the network. Simply stated, the non-interference condition is that no two base stations belonging to the MIS may also belong to a common maximal clique.

The subsets consisting of non-interfering base stations are precisely those which satisfy the inequality given in the third expression. (It should be noted in this regard that a reuse group is a special case of a non-interfering set.)

An example of a maximal clique is provided in FIG. 7. The set of base stations labeled by the reference numeral 100 is a maximal clique because all are mutually interfering, but if any additional one of the sixteen base stations were added to the set, at least one old member of the set would fail to interfere with the new member.

In order to simplify the computational problem, we have found it useful to relax the requirement that $x_i$ must be a binary integer. Instead, $x_i$ is permitted to range over the closed interval from 0 to 1, inclusive.

Standard linear programming techniques are used to obtain a solution vector $\{x_i^*\}$. Each component $x_i$, of this vector is rounded to a 0 or a 1 in order to produce a binary-valued vector that defines the MIS. Various rounding techniques for this purpose will be known to those skilled in the art. In one exemplary such technique, a global maximal value is identified in the output of the linear programming algorithm. The global maximal value is set to 1, and its neighbors are set to 0. The corresponding base stations are taken out of consideration, and the process is repeated.

As noted, after each channel is allocated, the queue length at each base station is reduced by a quantity representing the capacity of the channel (if any) allocated to that base station. By way of example, let each channel have the capacity M, as defined above. Thus, $$q_i \to q_i - x_i M.$$

From numerous simulation experiments, we have found that the components of the (unrounded) solution vector fall at or near the binary integer values in a great majority of the cases we have studied. This result is strongly indicative that the LP-based approach will have utility in real-life applications.

This approach achieves at least some degree of efficiency, because it allocates channels according to need. However, it may sometimes achieve unfair results by allocating a great preponderance of channels to the non-interfering set of base stations having the longest queues. Those skilled in the art will appreciate that various constraints can be included to enforce some degree of fairness.

The linear programming calculations are carried out at a central network location, such as the MSC. It should be noted that because of the computationally intensive nature of these calculations, and because network data must be passed to a central location, the LP-based approach typically has a latency greater than that of the carrier requesting approach.

The Carrier Raking Method

We now describe the method for filling the A-matrix referred to as the carrier raking method.

The carrier raking method requires the relevant base stations of the network to be divided into reuse groups. In each superframe, one reuse group is active (in a sense to be described below), and the remaining reuse groups are passive. Reuse groups take turns as active and passive groups, exemplarily in a cyclic fashion.

Just before the beginning of each superframe, all of the base stations in the passive reuse group determine which of their currently allocated channels they will keep for their own use. Then, each base stations of the active reuse group queries its respective neighbors (all of which must be passive) as to which channels they do not plan to use in the next superframe. Each active base station claims any channel which is not going to be used by any of its neighbors. It should be noted that in this context, a neighbor of a given base station is any interfering base station.

The initial allocation is, for example, the nominal allocation by reuse group described in connection with carrier requesting. An exemplary such allocation was shown in FIG 2.

After taking channels from its neighbors, each active base station determines which channels it will refuse to relinquish in the next superframe. The base station keeps the channels that it has taken for as long as it needs them. After determining that they no longer need certain channels, the active base stations relinquish them when, in their next turn, they become passive.

The procedure described above continues, one reuse group at a time, until every reuse group has had one turn. In each round, all base stations of the relevant reuse group carry out these operations independently and simultaneously (even though two or more base stations may be simultaneously querying a common neighbor).

Although there is a possibility that this procedure will not initially achieve a fair allocation of channels, it is highly probable that it will converge to an allocation having at least some degree of fairness within a few superframes.

Figure 10A:
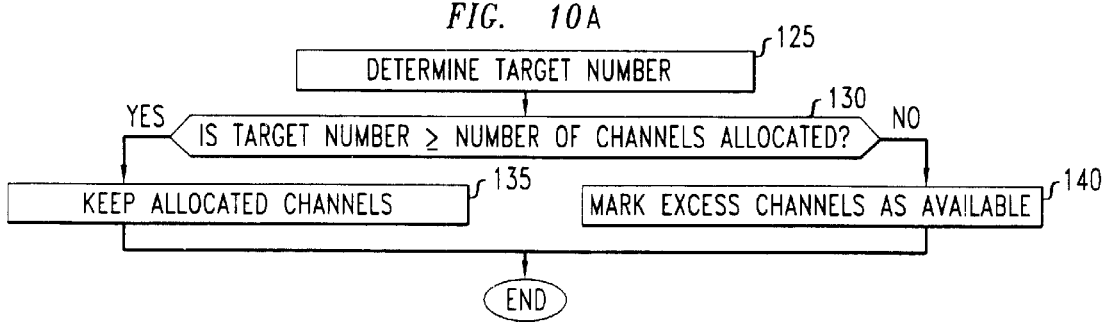
FIGS. 10A and 10B are flowcharts illustrating one exemplary round of borrowing transactions in accordance with the inventive carrier raking method of dynamic channel assignment, in certain embodiments.
Figure 10B:
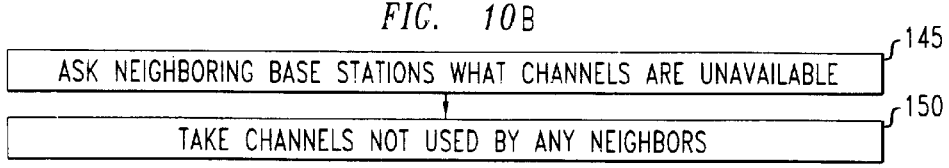

FIGS. 10A and 10B illustrate one exemplary round of transactions. As indicated by box 125 of FIG. 10A, each base station (of the currently passive reuse groups) determines its respective target number of channels. As indicated by box 130, it then decides whether the number of channels currently allocated to it is exceeded by its target. If that is the case, then all channels are retained, as indicated in box 135. Otherwise, excess channels are marked as available, as indicated in box 140.

Then, as indicated in box 145 of FIG. 10B, base stations in the active reuse group query all their neighbors as to which channels are unavailable. Channels not claimed by any neighbor of a given active base station are taken by such base station, as indicated in box 150.

By way of further illustration, FIG. 11 shows borrowing by one base station that could take place in a round of transactions. The borrowing base station is base station 1 of the array of FIG. 1. The initial allocation is that represented by the A-matrix of FIG. 2. In FIG. 11, the letter "C" indicates a channel that is both allocated and claimed. The letter "A" indicates a channel that went to the pertinent base station in the initial allocation, but was not claimed for use in the next superframe by that base station.

EXAMPLE

Figure 12:
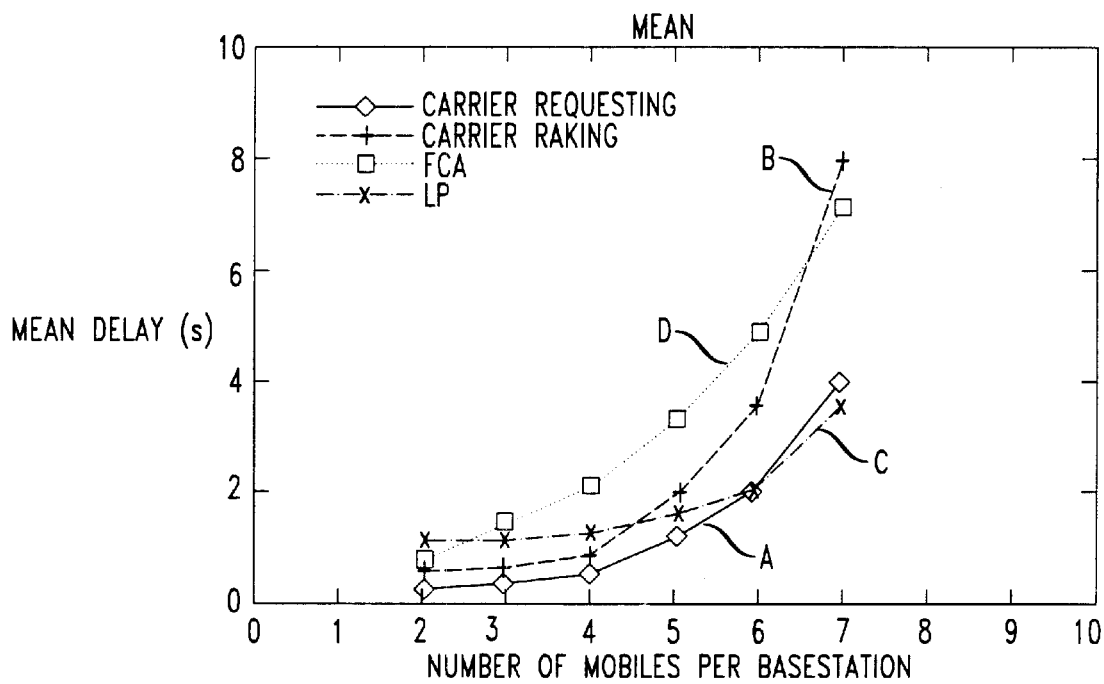
FIGS. 12 and 13 are graphs of the results of numerical simulations of network performance, for fixed channel allocation and for DCA carried out according to three alternate embodiments of the invention.
Figure 13:
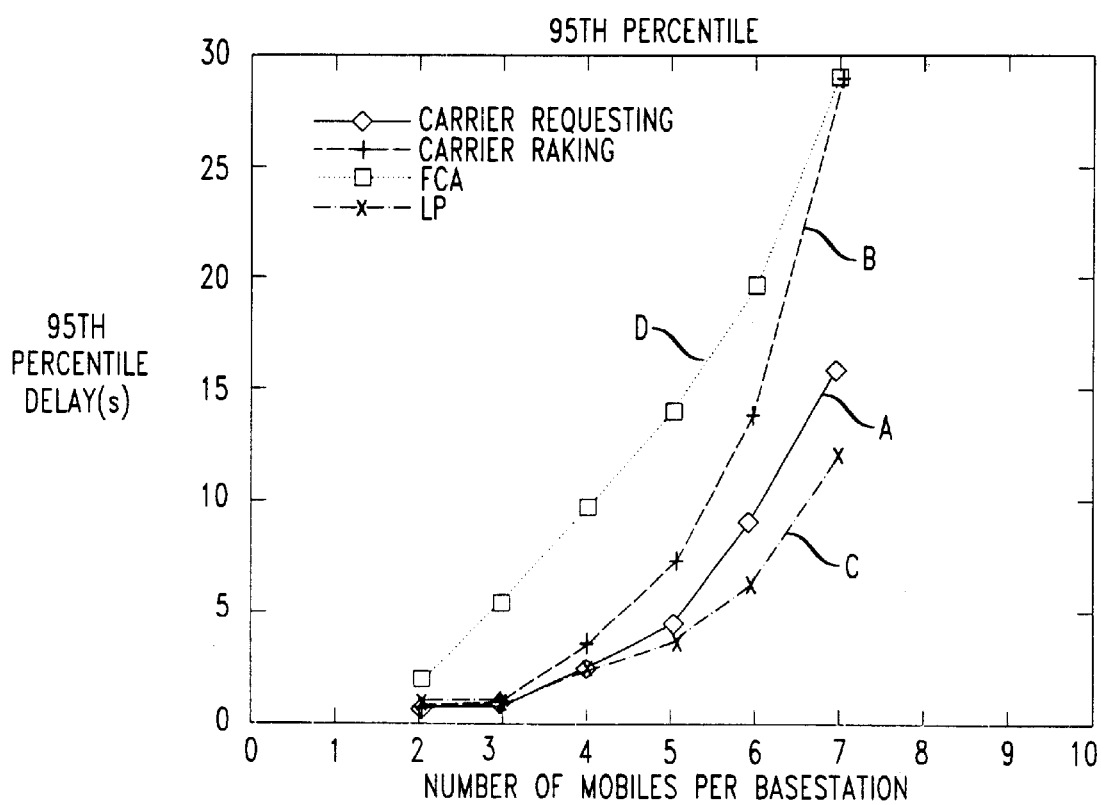

FIG. 12 is a graph of mean delay versus the number of mobile stations per base station, for carrier requesting (curve A), carrier raking (curve B), the LP-based approach (curve C), and fixed channel allocation (FCA) (curve D). FIG. 13 is a graph of the $95^{th}$ percentile delay versus the number of mobile stations per base station, for carrier requesting (curve A), carrier raking (curve B), the LP-based approach (curve C), and fixed channel allocation (FCA) (curve D). These graphs are the results of numerical simulations that we have performed.

In the graph of FIG. 13, 95% of all packets have delay less than the amount plotted, at each given number of mobile stations per base station.

FCA is a planned scheme in which each base station receives a predetermined allocation of channels. These are chosen to keep interference at an acceptable level regardless of which channels are actually being used. Referring to FIG. 1, an illustrative FCA scheme might assign channels 1–8 to base stations BS1–BS4, channels 9–16 to base stations BS5–BS8, and so forth.

In performing the numerical simulations, it was assumed that there are 32 carriers, and a maximum of eight carriers per mobile station. The duration of a superframe was assumed to be one second.

The invention claimed is:

1. A method for allocating multiple communication channels among a plurality of base stations belonging to a wireless communication network of the kind in which a queue of waiting units of buffer content can accumulate for each base station, each said queue having a respective queue length, the method comprising:

assigning channels to base stations according to a rule that forbids concurrent use of the same channel by interfering base stations; and at least once, reassigning one or more channels to at least one of said base stations according to said rule, wherein said reassignment of channels is carried out in response to a communication between said base station and at least one other network entity, and said reassignment of channels is carried out in a manner responsive to the queue length of said base station, wherein:

the reassignment of channels to at least one base station comprises reassigning at least one channel to a base station from a neighboring base station;

each said communication between a base station and a network entity comprises a meassage issued to said base station, by at least one neighboring base station, identifying channels that are available for reassignment; and the reassignment of channels to said base station comprises selecting one or more channels for reassignment from those channels identified as available.

2. The method of claim 1, wherein:

the method further comprises calculating a target number of channels for each of at least some of the base stations; and each message issued by a base station to identify channels available for reassignment is responsive to the excess, if any, of channels currently assigned to said base station over the target number of said base station.

3. The method of claim 2, wherein:

the plurality of base stations is subdivided into at least two distinct non-interfering sets, to be referred to as reuse groups; and the reassignment of channels to any given base station is limited to reassignment from neighbors which do not belong to the same reuse group as the given base station.

4. The method of claim 3, wherein:

in an initial allocation, a distinct subset of channels is allocated to each reuse group;

the method further comprises, for each base station, designating channels, if any, that are available for reassignment; and designated channels are channels that belong to the subset initially allocated to the pertinent base station and are in excess over the target number calculated for said base station.

5. The method of claim 4, wherein:

the reassignment of channels comprises reassigning channels to those base stations for which the target number exceeds the number of channels initially allocated to the reuse group of said base stations.

6. The method of claim 5, wherein the reassignment of channels is carried out such that no base station receives more channels than necessary to meet said base station's target number.

7. The method of claim 6, wherein:

the reassignment of channels takes place in response to channel requests sent to its neighbors by each base station having a target number that exceeds its current number of assigned channels, such base station to be referred to as a borrower.

8. The method of claim 7, wherein the reassignment of channels takes place in one or more concerted rounds, including a first round.

9. The method of claim 8, wherein:

a superframe is specified as a fixed, integer number of frames; and each round must be completed within one superframe.

10. The method of claim 9, wherein:

each borrower belongs to a reuse group;

each reuse group has an image reuse group under a permutation of the reuse groups; and in the first round, each borrower sends channel requests only to base stations belonging to a corresponding one of said image reuse groups.

11. The method of claim 10, wherein:

there are two or more rounds;

in each round after the first, each borrower sends channel requests to the same neighbors as in all previous rounds; and in each round after the first, each borrower sends further channel requests to base stations belonging to a corresponding image reuse group under a further permutation.

12. The method of claim 11, wherein:

in each round, borrowers of all reuse groups actively send channel requests.

13. The method of claim 12, wherein:

all rounds must be completed within one superframe.

14. The method of claim 9, wherein:

in each superframe, the base stations of only one reuse group actively send channel requests.

15. The method of claim 14, wherein:

each borrower, during a superframe in which it actively sends channel requests, sends channel requests to base stations of all reuse groups not its own.

16. The method of claim 1, wherein each said communication between a base station and a network entity comprises a message, to be referred to as an upstream message, from said base station to a network entity, wherein:

the upstream message is derived from the queue length of said base station; and the reassignment of channels is responsive to upstream messages received by the network entity from at least some of the base stations.

17. The method of claim 16, wherein the reassignment of channels comprises:

(a) determining a non-interfering set of base stations, to be referred to as an MIS, having a maximal aggregate queue length;

(b) allocating at least one channel to the base stations of the MIS; and (c) reducing the queue lengths of said base stations according to the capacity of the allocated channel or channels.

18. The method of claim 17, further comprising:
repeating steps (a)–(c) at least once.

19. The method of claim 18, further comprising:
repeating steps (a)–(c) until all channels are allocated.

20. The method of claim 1, wherein:

the plurality of base stations is subdivided into at least two distinct non-interfering sets, to be referred to as reuse groups;

the reassignment of channels to any given base station is limited to reassignment from neighbors which do not belong to the same reuse group as the given base station;

a superframe is specified as a fixed, integer number of frames; and in each superframe, channels are reassigned to base stations of only one reuse group, said reuse group to be referred to as the active reuse group, the remaining reuse groups to be referred to as passive reuse groups.

21. The method of claim 20, further comprising, in each superframe:

for each base station of the passive reuse groups, determining which of the channels currently allocated to said base station will be retained in the next superframe by said base station.

22. The method of claim 21, wherein, in each superframe:

via communications between neighboring base stations, each active base station determines which channels will not be retained in the next superframe by its neighboring base stations; and each active base station allocates to itself said non-retained channels.

* * * * *